United States Patent [19]

Okamoto

[11] 4,102,246
[45] Jul. 25, 1978

[54] HAND-OPERATED PROFILING MACHINE

[75] Inventor: Taiichi Okamoto, Kurobe, Japan

[73] Assignee: Yoshida Kogyo K.K., Tokyo, Japan

[21] Appl. No.: 810,596

[22] Filed: Jun. 27, 1977

[30] Foreign Application Priority Data

Jul. 5, 1976 [JP] Japan .................................. 51-80064

[51] Int. Cl.² .............................................. B23C 1/16
[52] U.S. Cl. ....................................... 90/13.2; 266/64
[58] Field of Search ..................... 90/13.2, 13.1, 13 R; 266/64

[56] References Cited

U.S. PATENT DOCUMENTS 799,825 9/1905 Behee ..................................... 90/13.2
2,025,081 12/1935 Anderson .......................... 266/64 X

FOREIGN PATENT DOCUMENTS 576,518 4/1946 United Kingdom .................. 90/13.2

Primary Examiner—Gil Weidenfeld
Attorney, Agent, or Firm—Hill, Gross, Simpson, Van Santen, Steadman, Chiara & Simpson

[57] ABSTRACT

A hand-operated profiling machine includes a cutter-holding head supported on a support which is mounted for movement toward and away from a table. The head is mounted in a cover which is supported on a pair of guide rods extending through linear bearings fixed to a shaft extending through ball bearings mounted on the support, the shaft extending perpendicularly to the table. The head is pivotable about and movable toward and away from the shaft. An adjustable template is supported on the support and guides the movement of a guide pin mounted on the head.

9 Claims, 5 Drawing Figures

HAND-OPERATED PROFILING MACHINE

BACKGROUND OF THE INVENTION

1. Field of the Invention

The present invention relates to a hand-operated profiling machine.

2. Prior Art

Hand-operated profiling machines, as shown in German Pat. No. 1,295,174, have a cutter-holding head that can be guided for cutting movement by means of a fixed guide pin or stylus which is held against and follows the outline or profile on a template. Known heads are usually carried on crossing guide rails and moved thereon by manipulating levers attached to the heads. With the guide rails, however, the machine becomes complicated in structure and large in size. Further, with the head on the guide rails, the operator frequently finds it difficult to manipulate the head smoothly.

SUMMARY OF THE INVENTION

According to the present invention, a support is mounted on a table by a pair of rods extending perpendicularly to and slidably through the table, the rods being movable up and down to allow the support to move away from and toward the table. A head for holding a cutter is mounted on a pair of guide rods extending through a pair of linear bearings, respectively, which are contained in a bearing block. The bearing block is fixed to a shaft journalled in a ball bearing mounted on the support, the shaft extending substantially perpendicularly to the table. The head is pivotable about and movable toward and away from the shaft. An adjustable template is mounted on the support and guides the movement of the head relative to the shaft through a guide pin attached to the head.

Accordingly, it is an object of the present invention to provide an improved hand-operated profiling machine.

Another object of the present invention is to provide a hand-operated profiling machine which is relatively simple in structure and small in size.

A still further object of the present invention is to provide a hand-operated profiling machine having a cutter-holding head that can be manipulated smoothly.

Many other advantages, features and additional objects of the present invention will become manifest to those versed in the art upon making reference to the detailed description and the accompanying drawings in which a preferred structural embodiment incorporating the principles of the present invention is shown by way of illustrative example.

DETAILED DESCRIPTION OF THE PREFERRED EMBODIMENT

Figure 1:
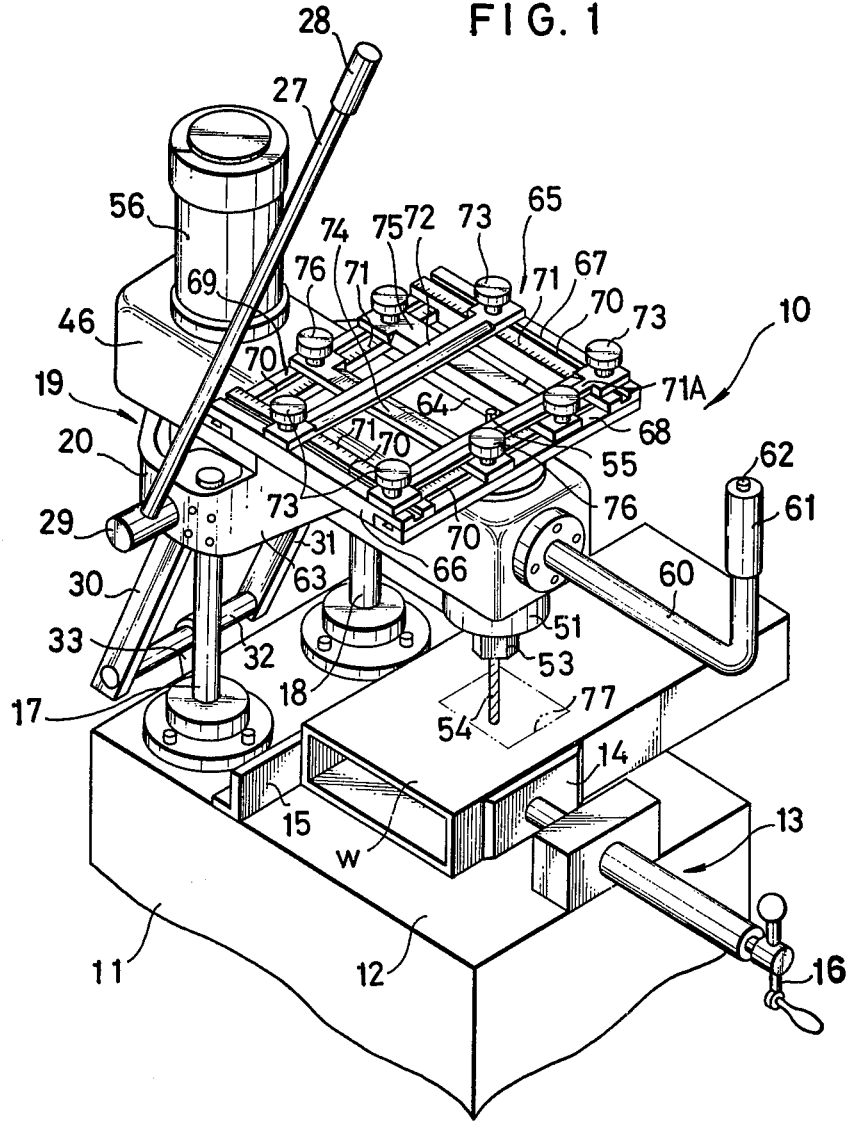
FIG. 1 is a perspective view of a hand-operated profiling machine constructed in accordance with the present invention.
Figure 2:
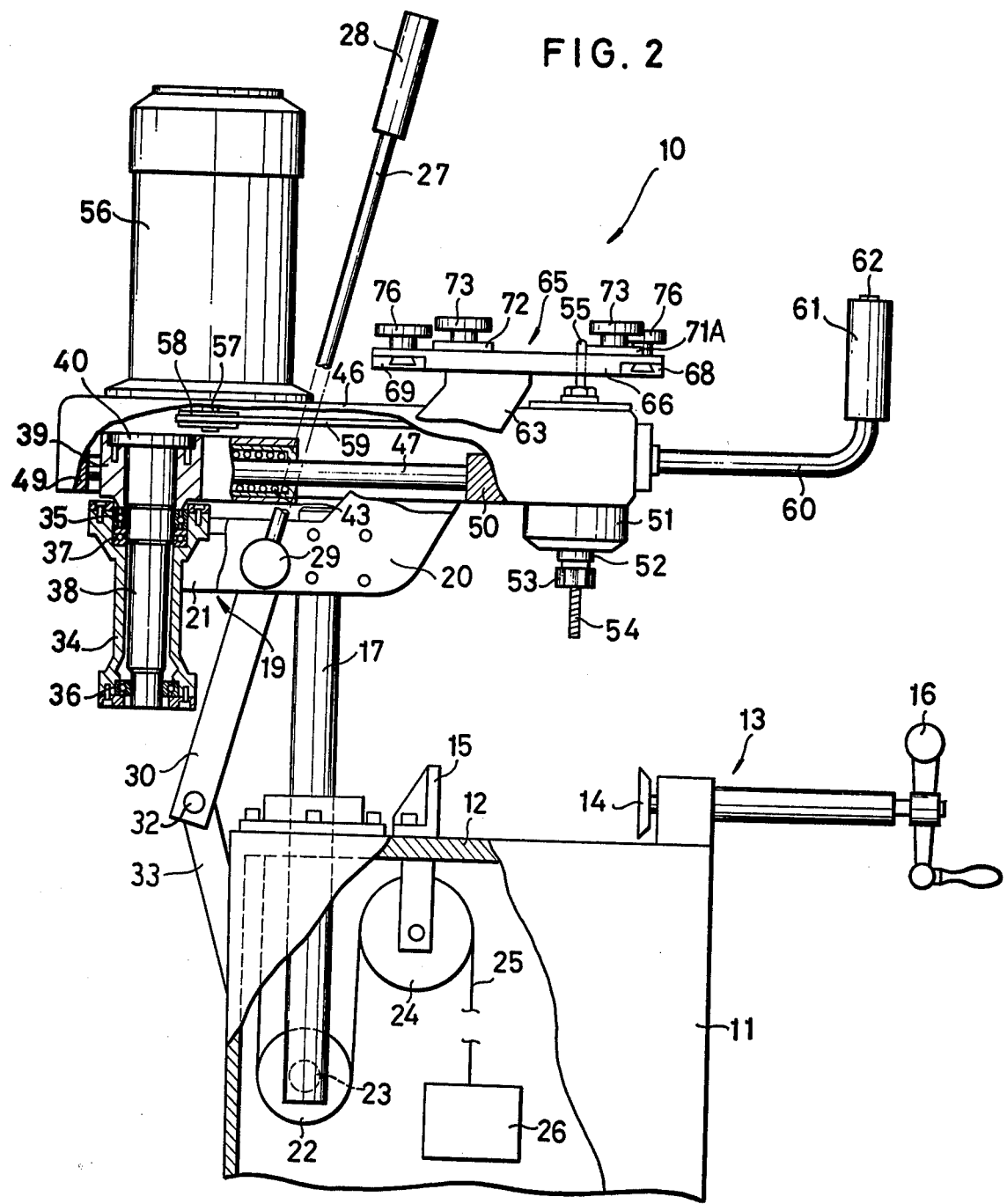
FIG. 2 is a side elevational view of the hand-operated profiling machine, with parts being cut away to show the interior.

The principles of the present invention are particularly useful when embodied in a hand-operated profiling machine such as shown in FIGS. 1 and 2, generally indicated by the numeral 10.

The hand-operated profiling machine 10 has a base 11 which includes a table 12 supporting thereon a screw-operated vise 13 including a front jaw 14 and a rear jaw 15. The front jaw 14 is movable toward and away from the rear jaw 15 fixed to the table 12 upon rotation of a hand crank 16. A workpiece w such as an aluminum structural bar (FIG. 1) is inserted between the jaws 14,15 and supported rigidly thereby on the table 12.

A pair of vertical rods 17,18 extend substantially perpendicularly to and slidably through the table 12, the rods 17,18 being located rearwardly of the fixed rear jaw 15. A support 19 has a pair of arms 20,21 fixed to the upper ends of the rods 17,18, respectively. The support 19 is movable away from and toward the table 12 with up-and-down movement of the rods 17,18.

A first pulley 22 is rotatably mounted on a horizontal shaft 23 fixed to and extending between the lower ends of the rods 17,18 located under the table 12. A second pulley 24 is rotatably mounted on the underside of the table 12. Running around the first and second pulleys 22,24 is a wire 25 having one end fixed to the table 12 and the other end to a counterweight 26. The counterweight 26 acts to maintain the support 19 in a state of balance or in equilibrium above the table 12 such that the support 19 can be moved toward and away from the table 12 with a minimum amount of force.

A lever 27 having a grip 28 is fixed to one end of a pivot shaft 29 pivotally extending through the support arms 20,21. A pair of parallel link bars 30,31 are secured at one of their ends to the pivot shaft 29, the other ends of the link bars 30,31 being connected by a pin 32. Pivoted to the pin 32 is one end of a link 33 with its other end being pivotally coupled to the base 11. When the lever 27 is lowered so as to pivot clockwise as viewed in FIG. 2, the rods 17,18 are forced to slide downwardly. Conversely, the counterclockwise pivotal movement of the lever 27 causes the rods 17,18 to slide upwardly. The base 11 has a suitable clamp (not shown) for holding the pin 32 firmly in place with respect to the base 11, thereby arresting the up-and-down movement of the rods 17,18 such as for replacement of a milling cutter.

The support 19 has a ball-bearing block 34 (FIG. 2) secured to and disposed between the rear ends of the arms 20,21, the bearing block 34 containing a pair of upper and lower radial ball bearings 35,36 and a thrust ball bearing 37 located beneath the upper radial bearing 35, these bearings 35,36, and 37 being in vertical coaxial alignment with each other. A shaft 38 is rotatably journalled in the bearings 35,36, and 37, the shaft 38 having its central axis extending substantially perpendicularly to the table 12.

Figure 3:
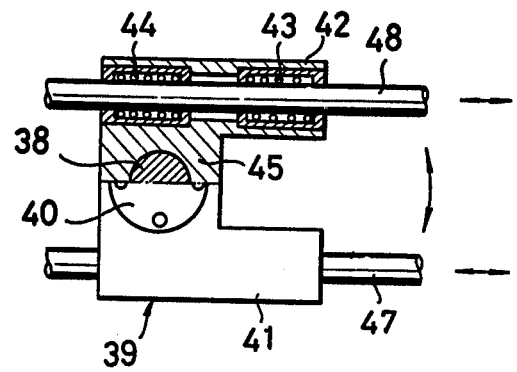
FIG. 3 is a plan view, partly broken away, of a linear bearing block.

The shaft 38 has an upper end projecting out of the bearing block 34 and is fixed to a linear-bearing block 39 by a retainer disk 40 on the upper end of the shaft 38, the disk 40 being screwed to the block 39. As shown in FIG. 3, the linearbearing block 39 is in the form of a U comprising a pair of legs 41,42 each containing a pair of aligned linear bearings, here shown as linear ball bearing assemblies 43,44, and an intermediate member 45 connecting the legs 41,42 together and in which the upper end of the shaft 38 is mounted. The axes of the linear ball bearing assemblies 43,44 in each pair extend substantially perpendicularly to the axis of the shaft 38, but horizontally offset therefrom.

A trough-like elongated cover 46 houses therein a pair of horizontal guide rods 47,48 extending lengthwise thereof. Each rod 47,48 has a rear end fixed to a bracket 49 mounted in a rear end of the cover 46 and a front end fixed to a bracket 50 mounted in a front end portion of the cover 46. A head 51 is mounted in a front end of the cover 46 and has a spindle 52 and a collet nut 53 rotatably supported thereon, the collet nut 53 holding coaxially a milling cutter 54 directed downwardly toward the table 12. The head 51 has a fixed guide pin or stylus 55 extending upwardly, the guide pin 55 being coaxial with the attached cutter 54.

The cover 46 supports thereon an electric motor 56 located adjacent to the rear end of the cover 46. The motor 56 has a shaft having one end 57 extending downwardly into the interior of the cover 46. To the shaft end 57 is keyed a pulley 58 around and driving which runs a belt 59 travelling around a spindle shaft in the head 51. Upon energization of the motor 56, the belt 59 rotates the spindle 52 and hence the cutter 54.

The horinzontal rods 47,48 extend through the pairs of the linear ball bearing assemblies 43,44, respectively. Thus, the rods 47,48 are longitudinally slidable through the pairs of the linear ball bearing assemblies 43,44, so that the cover 46 can move back and forth and the head 51 can move toward and away from the vertical shaft 38. Further, the rods 47,48 and the head 51 mounted thereon can pivot about the shaft 38. The head 51, therefore, can effect any movement in a horizontal plane determined by a vertical position of the support 19, such movement being produced by combined linear and pivotal motion of the rods 47,48 with respect to the shaft 38.

An L-shaped handle 60 is fixed at one end to the front end of the cover 46 and extends longitudinally of the cover 46. At the other end, the handle 60 has a grip 61 and a push button 62 of a starter switch for the motor 56.

The support arms 20,21 have their front end portions 63,64 directed upwardly one at each side of the cover 46, the front end portions 63,64 supporting thereon a guide means 65. The guide means 65 is positioned above the corner 46 so as to be over an area wherein the head 51 is horizontally movable.

The guide means 65 is an adjustable template comprising a pair of spaced parallel bars 66,67 fixed to the front end portions 63,64, respectively, of the support arms 20,21, and a pair of spaced parallel bars 68,69 extending perpendicularly to and connected at their ends to the bars 66,67. Each of the bars 66,67,68 and 69 has a longitudinal groove 70 in its top face and is marked with scales 71 along one edge thereof. A pair of slides 71A,72 extend between the bars 66,67 and are linked thereto at the ends by means of bolts 73 extending into the grooves 70 in the bars 66,67. Upon loosening of the bolts 73, the slides 71A,72 can move toward and away from each other along the bars 66,67, and can be held in a desired position by tightening the bolts 73. Similarly, a pair of slides 74,75 are slidable along the bars 68,69 and can be fixed thereto by tightening similar bolts 76.

The guide pin 55 extending from the head 51 projects into a space surrounded by the slides 71A,72,74 and 75. By fixing the slides 71A,72,74 and 75 at selected positions on the bars 66,67, 68 and 69, the slides jointly provide a desired pattern for the guide pin 55 to trace along.

The milling cutter 54 is an end mill having the same diameter as that of the guide pin 55, such that a hole substantially equal in contour to a pattern of the template 65 can be produced in the workpiece w. However, an end mill of a different diameter may be used if the template pattern is required to remain unchanged and if it is desired to provide a hole having a larger or smaller contour than that of the pattern by the diameter difference. The mill radius determines the radius of the aperture corners in the workpiece.

Figure 4:
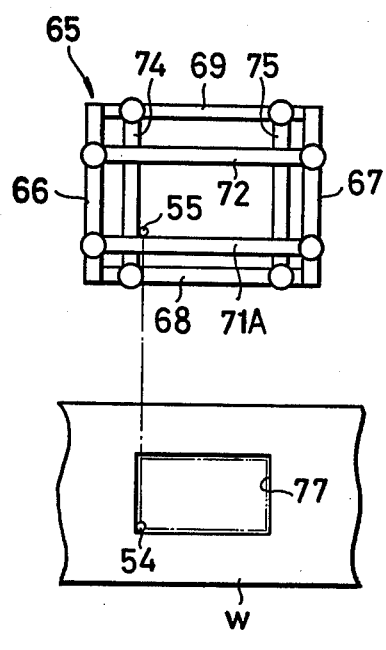
FIG. 4 is a schematic view showing a relationship between a template and a hole to be defined in a workpiece.
Figure 5:
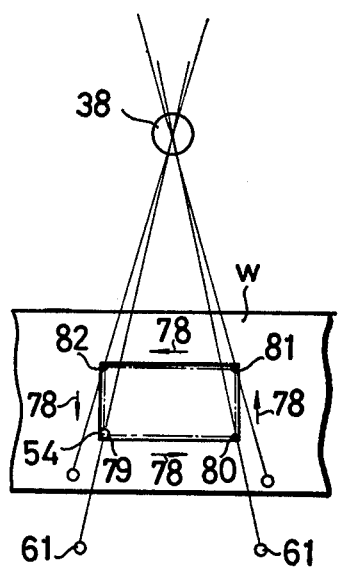
FIG. 5 is a schematic view illustrative of the movement of a cutter relative to an axis on which a cutter-holding head is pivotally mounted.

To provide a rectangular hole 77 in the workpiece w clamped on the table 12, the slides 71A,72,74 and 75 are first adjusted along the bars so as to jointly form a pattern identical with the hole 77 (FIG. 4). Then, all of the slides are fixed to the bars by tightening the bolts 73,76. The push button 62 is depressed to rotate the cutter 54 and the lever 27 is pulled down to lower the cutter 54 toward the workpiece w. The rotating cutter 54 is forced downwardly until it penetrates the workpiece w. The, with the lever 27 held stationary, the handle 60 is manipulated to enable the guide pin 55 to trace the template pattern slowly; that is, to be held against the edges of the slides 71A,72,74 and 75 as the guide pin 55 is moved in guided engagement therewith. At the same time, the cutter 54 is moved in the workpiece w along the arrows 78 from corners 79 to 80 to 81 to 82 and again to 79, as shown in FIG. 5, to thereby provide the hole 77 in the workpiece w.

Although various minor modifications may be suggested by those versed in the art, it should be understood the I wish to embody within the scope of the patent warranted hereon, all such embodiments as reasonably and properly come within the scope of my contribution to the art.

I claim as my invention:

1. A hand-operated profiling machine comprising;
   (a) a table;
   (b) a support mounted on and being movable toward and away from said table, said support having a shaft extending substantially perpendicularly to said table;
   (c) a head supported on said support and having means for holding a cutter, said head being pivotable about and movable toward and away from said shaft; and
   (d) guide means mounted on said support, said head being confined in motion relative to said shaft by said guide means.

2. A hand-operated profiling machine according to claim 1, said support including a pair of rods extending sustantially perpendicularly to and slidably through said table, there being balancer means under said table maintaining said support in equilibrium above said table.

3. A hand-operated profiling machine according to claim 2, said balancer means comprising a first pulley rotatably mounted on said rods, a second pulley rotatably mounted on said table, a wire having one end fixed to said table and running around said first and second pulleys, and a counterweight fixed to the other end of said wire.

4. A hand-operated profiling machine according to claim 2, said support including a pair of arms supporting said guide means, said rods being fixed to said arms, respectively.

5. A hand-operated profiling machine according to claim 1, said support including ball bearing means and said shaft being rotatably journalled in said ball bearing means and having one end operatively coupled with said head.

6. A hand-operated profiling machine according to claim 5, comprising a bearing block fixed to said one end of said shaft, said bearing block containing a pair of linear bearings, there being a pair of guide rods extending parallel to said table through said linear bearings, and said guide rods each having one end fixed relatively to said head.

7. A hand-operated profiling machine according to claim 6, comprising an elongate cover housing said guide rods that extend lengthwise of said cover, said head being mounted in one end of said cover, and the other ends of said guide rods being fixed to the other end of said cover.

8. A hand-operated profiling machine according to claim 7, said cover supporting thereon an electric motor for rotating said cutter holding means.

9. A hand-operated profiling machine according to claim 1, said guide means comprising an adjustable template, and said head having a guide pin coaxial with said cutter holding means and engageable with said adjustable template.

* * * * *